United States Patent [19]
Yoshida et al.

[11] Patent Number: 5,584,230
[45] Date of Patent: Dec. 17, 1996

[54] BREAD MAKING APPARATUS

[75] Inventors: Shinji Yoshida, Kadoma; Yasumasu Hironaka, Nara; Hisanobu Tanaka, Osaka; Hironobu Shimokubo, Daito, all of Japan

[73] Assignee: Funai Electric Co., Ltd., Nakagaito, Japan

[21] Appl. No.: 413,481

[22] Filed: Mar. 30, 1995

Related U.S. Application Data

[62] Division of Ser. No. 160,388, Dec. 1, 1993, Pat. No. 5,415,081.

[30] Foreign Application Priority Data

Dec. 1, 1992 [JP] Japan ................... 4-343620
Feb. 19, 1993 [JP] Japan ................... 5-30723
Feb. 19, 1993 [JP] Japan ................... 5-30724
Jul. 21, 1993 [JP] Japan ................... 5-39790
Oct. 8, 1993 [JP] Japan ................... 5-277694

[51] Int. Cl.⁶ ............... A21B 1/00; A21D 8/00; A47J 27/00; A47J 37/01
[52] U.S. Cl. ............... 99/326; 99/331; 99/348; 99/468; 366/98; 366/146; 366/314
[58] Field of Search ............. 99/325–328, 329 R, 99/331–333, 337, 338, 348, 352, 353, 467, 468, 483, 484, 486; 366/69, 96–98, 144–147, 601, 314; 426/504, 512

[56] References Cited

U.S. PATENT DOCUMENTS

| | | | |
|---|---|---|---|
| 4,538,509 | 9/1985 | Ojima et al. | 99/352 X |
| 4,762,057 | 9/1988 | Hirota et al. | 99/329 R |
| 4,776,265 | 10/1988 | Ojima | 99/348 |
| 4,836,683 | 6/1989 | Aoyama | 366/98 |
| 4,844,048 | 7/1989 | Aruga et al. | 99/348 |
| 4,903,587 | 2/1990 | Nagasaka et al. | 99/325 |
| 4,930,899 | 6/1990 | Aoyama | 366/98 |
| 4,951,559 | 8/1990 | Arau et al. | 366/146 X |
| 4,957,040 | 9/1990 | Nakakura et al. | 99/331 X |
| 4,984,512 | 9/1991 | Takahashi et al. | 99/327 |
| 5,076,153 | 12/1991 | Takahashi et al. | 99/468 |
| 5,415,081 | 5/1995 | Yoshida et al. | 99/326 |

*Primary Examiner*—Timothy F. Simone
*Attorney, Agent, or Firm*—Lackenbach Siegel Marzullo Aronson & Greenspan, P.C.

[57] ABSTRACT

A bread baking apparatus makes dough by kneading raw ingredients tossed into a bread baking case installed in an oven, and baking after fermentation. The object of this invention is to conveniently provide attractive-appearing bread having a specified expanded volume and a prespecified color when baked. Namely, in order to prevent undesirable results, such as expanding more or less than specified in the fermenting process, or being affected by external room temperature and humidity which has penetrated the oven through a glass lid installed on the baking oven, this apparatus is provided with means for detecting fermenting conditions while fermenting, and means for extending the fermenting process time. This apparatus is further provided with baking timer means for defining the color of the final baked product by applying temperature measuring means. Furthermore, air ventilating and heating means, especially uniform heating means during baking are provided in this apparatus to prevent unwanted changes in the baking bread.

6 Claims, 13 Drawing Sheets

BREAD MAKING APPARATUS

This is a division of application Ser. No. 08/160,388 filed Dec. 1, 1993, now U.S. Pat. No. 5,415,081.

BACKGROUND OF THE INVENTION

This invention relates to a bread making apparatus primarily for domestic use, and in particular relates to an apparatus which makes bread, first making dough by mixing and kneading raw materials in a baking case, and then baking the dough after fermentation.

A conventional bread baking apparatus in Japanese patent laid-open No. Showa 63-197417 teaches placing wheat flour, water and yeast into a bread baking case set in a closed oven, making dough by kneading, then fermenting the dough, and baking the desired type of bread.

In this prior art, by pushing down a start button, a sequence program stored in ROM of a microcomputer reads out the bread baking processes in the following order: primary-kneading process→pause period→secondary kneading process→fermenting process→baking process→ cooling process, and the baking process progresses sequentially, with each process assigned a prescribed time. Each specified processing time in the above-mentioned sequence program is set, with the forming-fermenting process, for example, being allocated about 50 minutes.

Because the conventional bread making apparatus is so controlled, miscellaneous drawbacks eventually arise as described below.

Namely, at first, an upper portion of a conventional oven has a detachably installed bread baking case which opens upwardly and a transparent glass lid openably installed thereon. This transparent lid allows for easy observation of the bread-making progress. However, despite this convenience, bread making conditions are apt to be effected by external room temperatures and humidity through the transparent glass. The fermenting dough will expand its volume, especially at high room temperatures and at high humidity levels, will come in contact with the lid, and be baked in this manner. The appearance of the baked bread is therefore disagreeable, and removing the bread stuck on the lid might lead to contamination.

Further, as the dough forming and fermenting periods are allocated specified times in the bread making process, and these specified times are stored fixedly in the sequence program, it is impossible to regulate the time periods. Accordingly, a shortage in the prespecified forming-fermenting time can occur when the apparatus is affected by the temperature of the ingredients, the external temperature and humidity introduced through the transparent glass window or other miscellaneous conditions, especially under conditions of low temperature and low humidity. The resultant dough-forming and fermenting process is insufficient, producing bread that has not sufficiently risen during the fermenting process.

The normal expansion of the dough during the fermenting process is the most important point in producing good bread. In order to obtain agreeable-looking bread, there were many problems relating to the color of the baked bread in the baking process following fermentation and the cooling process that follows baking.

SUMMARY OF THE INVENTION

The present invention has been developed to solve the afore-mentioned drawbacks, and its object is to provide a bread making apparatus furnished with a lid made of transparent glass for easily observing the state of the bread making process, and to enable the production of well-formed bread despite a propensity to be affected by external temperature and humidity.

In a bread making apparatus according to the first embodiment, a baking oven, a bread baking case detachably installed in the oven, a lid openably installed on the opening of the oven and a control means for controlling bread making processes comprises:

a mixing and kneading process for tossing raw bread ingredients in the baking case, kneading them and making bread dough;

a fermenting process for fermenting the dough; and a baking process for baking the fermented bread dough; the controlling means characterized by being provided with:

a fermentation detecting device for detecting the dough expanding near the lid during the fermentation process; and a process-switching device for stopping the fermentation process when the detecting device detects the expansion of the dough, and for switching from the fermentation process to the next baking process.

A bread making apparatus according to the second embodiment is the bread making apparatus cited in claim 1, wherein the controlling means is characterized by further being provided with:

an extension time-setting means which outputs a signal to the controlling means for extending the forming-fermenting time preceding the baking process;

a process extending means controlling the bread making processes for extending the fermenting time by applying the output from the extension-time setting means; and the extension-time setting means sets an extension time and the process extending means extends the fermenting process, when the detecting signal from the fermentation detecting means does not output and the dough does not expand to the specified volume, before the end of the set time of the fermenting process.

A bread making apparatus according to the third embodiment is the bread making apparatus cited in claim 1 and 2, wherein the controlling means is characterized by further being provided with:

a temperature detecting means which detects the temperature in the bread dough;

a color-setting means which sets a color of baked bread; and, timer means for setting a baking time of the dough that has reached a standard dough temperature corresponding to the color set by the color-setting means, after the temperature detecting means detects that the dough temperature has already reached the specified standard dough temperature.

A bread making apparatus according to the fourth embodiment is the bread making apparatus cited in claim 1, 2 and 3, wherein the control means is characterized by further being provided with:

an air supply means for dehumidifying the baked bread by supplying external air in the enclosed baking oven after the baking process; and a heating means for intermittently heating the baked bread by repeating an ON·OFF action at specified time intervals while applying the air supply means.

A bread making apparatus according to the fifth embodiment is the bread making apparatus cited in claims 1, 2, 3 and 4, wherein the baking oven is characterized in that, a ring-shaped heater installed on the inner surface of the inner oven is concentrically placed around the bread baking case, and both ends of the heater at the end of the power inputting end are crossed over each other, and the low heat-generating portion of the heater is not around the bread baking case.

A bread making apparatus according to the sixth embodiment is the bread making apparatus cited in claims 1, 2, 3 and 4, wherein the baking oven is characterized in that, a ring-shaped heater installed on the inner surface of the inner oven is eccentrically placed around the bread baking case, and the low heat-generating portions corresponding to both parallel ends of the heater are located near the bread baking case, and the baking case is uniformly heated in every portion thereof.

DETAILED DESCRIPTION OF THE INVENTION

Embodiments according to this invention are described in detail with reference to the drawings.

The first embodiment

Figure 1:
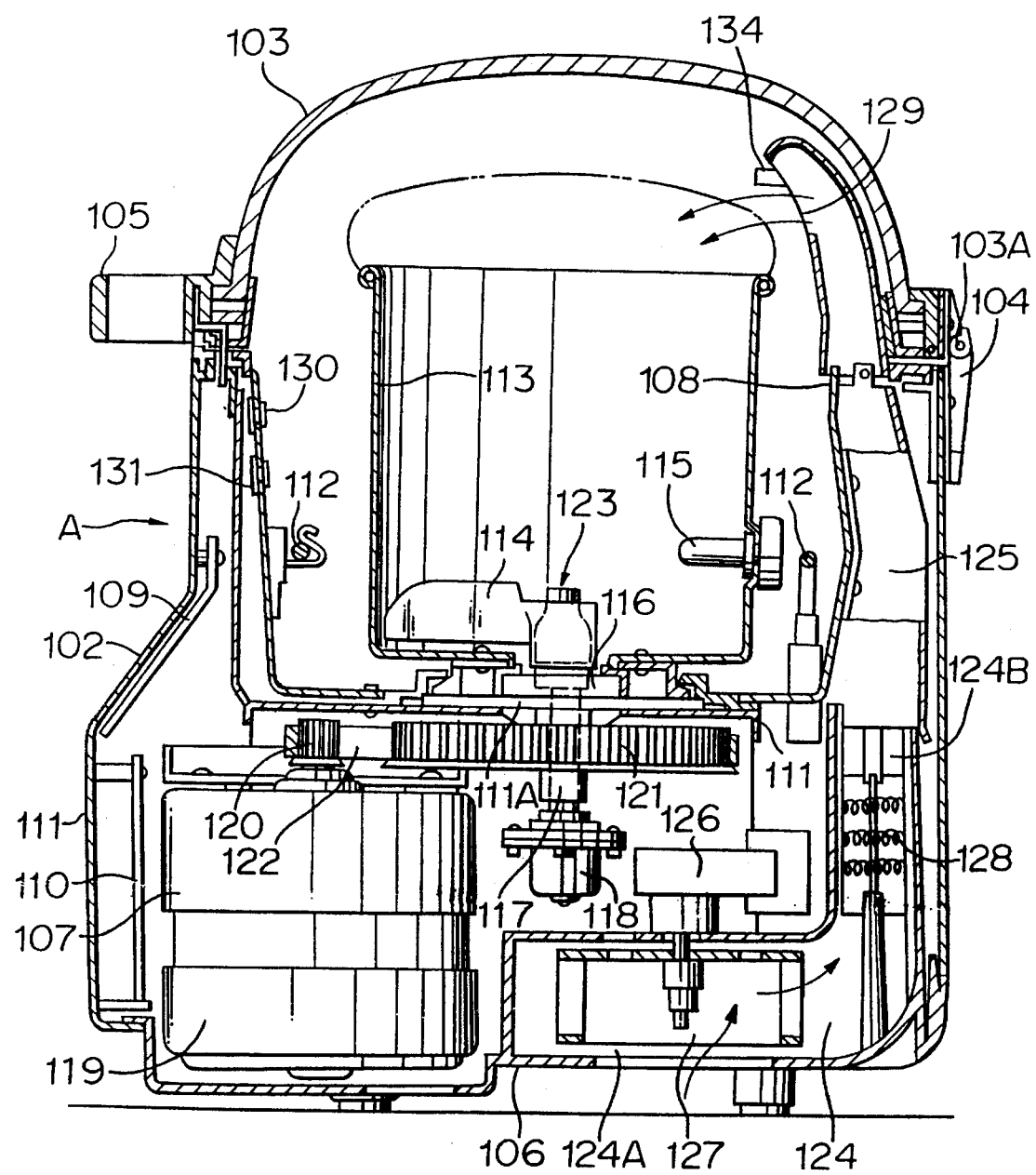
FIG. 1 shows a sectional view of a bread making apparatus according to the first embodiment.

The first embodiment is described as follows:

In a bread making apparatus A shown in FIG. 1, a cylindrical bread baking oven 101 is provided. A control board 102 for setting each process time and selecting the preferred baking results is installed on the front center portion of the oven 101, and the dome-like lid 101 is openably installed on the upper opening of the oven 101, and then the closed bread making apparatus is comprised of the oven 101 and the lid 103. In this arrangement, the lid 103 is made of transparent glass enabling observation of the internal conditions of the oven, even if it is closed, as the rear end of the lid is rotatably hinged to the oven 101 with a hinge pin 103A, and furthermore a grip handle 105 is installed on the front side thereof for easy opening of the lid 103.

In the baking oven 101, a cylindrical internal case 108 is installed on a location apart from the bottom wall 106 of the vessel 101 upwardly as much as specified space 107, and correspondingly downwardly to the lid 103, and in the space 107, a base plate 109 for installing a display and switches corresponding to the control board 102, and a computing circuit board 110 are installed biased to the front side of the main body 101.

In the main body 101, a support-member 111 is installed vertically on the bottom plate 106, the inner case 108 is fixed on the support-member 111, and in this arrangement a heat-radiating main heater 112 equivalent to an electric heater is installed around the internal surface of the inner case 108 in a ring shape, and the bread baking case 113 opened upwardly is detachably installed on the part 111A equivalent to one part of the supporting plate 111 extruded in the inner case from the central opening of the inner case 108.

Further a kneading blade 114 for mixing and kneading bread ingredients in the bread baking case 113 is rotatably provided on the bottom of the case by a device described later, and an extruded member 115 for preventing the co-rotation of the dough being clay-like by the agitation with the kneading blade 114 is fixed on the inner surface of the case 113.

While a bearing plate 116 is fixed on the supporting member 111, and the rotating shaft 117 driving the kneading blade 114 penetrates the supporting plate 116, the top end of the rotating shaft 117 is connected to the kneading blade 114, and the bottom end thereof is rotatably supported on the support 18 securely installed on the support member 111 in the space 107 of the oven 101.

A main motor 11a is enclosed in the space 107, and an output shaft of the main motor 11a and the rotating shaft 117 are connected by a pair of timing pulleys 120, 121 and a timing belt 122. With this arrangement, the kneading blade 114 is driven by the revolving force of the main motor 119. A dough sensor 123 comprised of a thermistor for detecting the dough temperature is installed on the kneading blade 114.

In the oven 101, an external air-inducing path 124 is shaped so that an end portion 124A thereof is opened externally through an opening shaped in the bottom plate, and connected to the bottom portion of a guide duct 125 shaped longitudinally along the external side face of the case 108. Installed in the external air-inducing path is an air fan 127 driven by a fan motor 126 which sucks external air, and a fan heater 128 for heating the sucked air is also installed in the downstream of the air fan 127. As a result, the air induced from the path 124 and forced in the guide duct 125 is blown against the bread baking case 113 through a duct hole 129.

Figure 2:
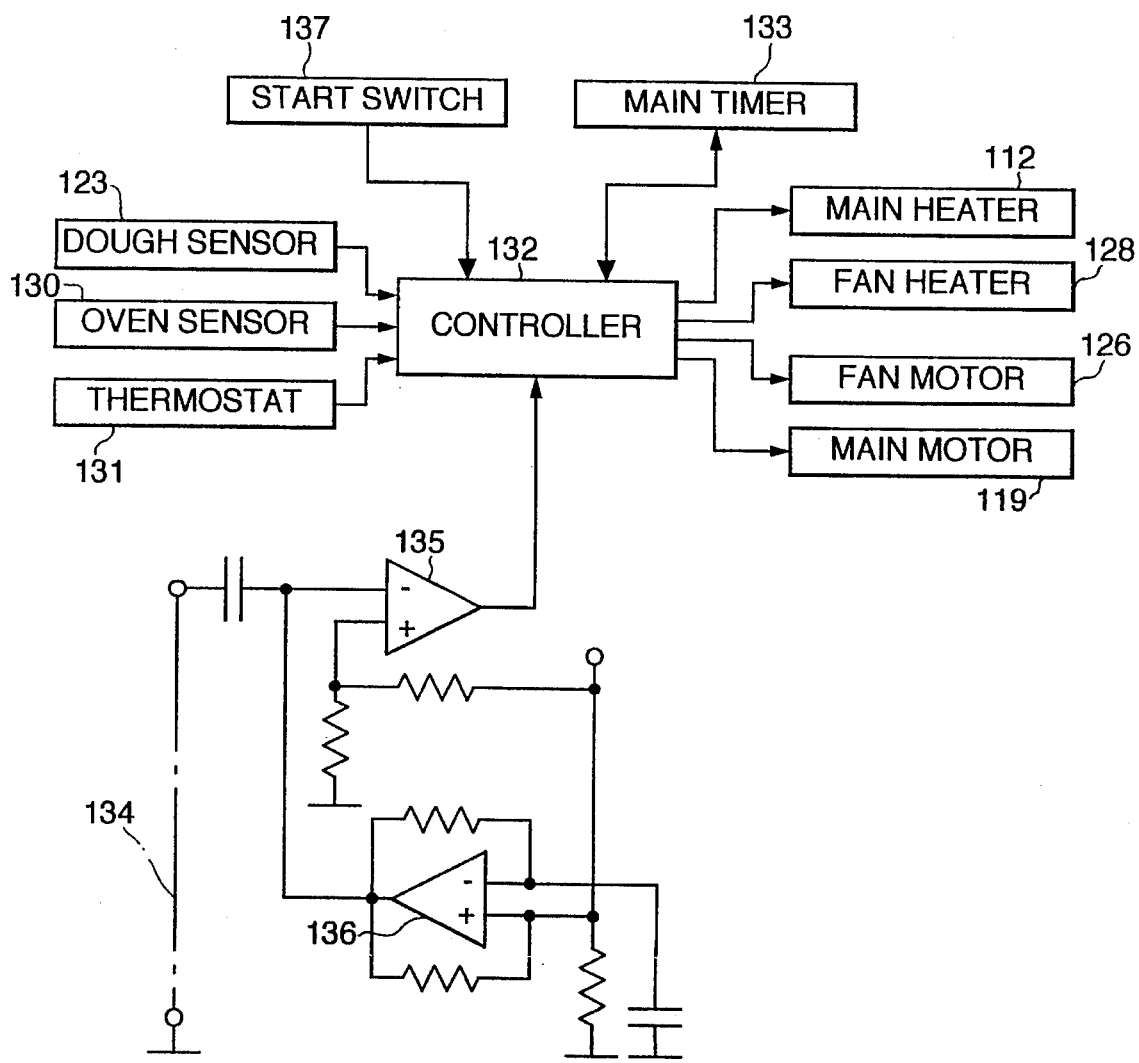
FIG. 2 shows a diagram of a control circuit of the apparatus shown in FIG. 2.

Furthermore, an oven sensor 130 which detects the temperature of the air in the inner case 108 is installed on the inner surface of the case 108, and a thermostat 131 is installed on the outer surface of the case 108. By applying the sensor 130, thermostat 131 and aforementioned dough sensor 123, temperature detection in the multiple processes composing the bread making process is performed. Namely, as shown in FIG. 2, the dough sensor 123, oven sensor 130, and thermostat 131 are connected to the controller 132, and the main heater 112, fan heater 128, main motor 119 and fan motor 126 are also connected to this controller 132, with a main timer 133 for setting the bread baking time also being connected thereto.

In addition, a fermentation regulating sensor 134 which detects the touch of the expanded dough to the guide duct 125 before the dough contacts the lid 103 during the fermentation process, is installed on the above-mentioned guide duct 125. As shown in FIG. 2, this fermentation regulating sensor 134 is connected to the comparative terminal of a comparator 135 and together with output of a transmitter 136, the wave form of a signal input to the comparative terminal is deformed by the change of resistance induced by the fermentation regulating sensor 134 being "ON". As a result, a touch signal is input into the controller 132, and the controller then forcibly controls the process to switch to the baking process even if the process is in the prespecified fermenting process.

Next, the action of the bread making processes are described. The specified materials are put in the bread baking case 113, the lid 103 is closed, the start switch 137 of the control board 102 (see FIG. 2) is put on after setting the baking time by applying the main timer 133, then the main heater is put on, and the preheating process begins. Then when the preheating process has ended, the rotation of the main motor 119 starts the kneading blade 114 agitating the bread ingredients. The baking process then switches to the kneading process by introducing hog air into the bread baking case 113 after the fan motor 126 is driven and the fan heater is put on, thus molding the dough. These processes are regulated and processed by the controller 132 which controls the excess temperature produced by the main heater 112 and fan heater 128, so that the temperature is maintained within a range that does not kill the yeast, by applying the temperature detected by the thermostat 131. The bread making processes then proceed to the next fermenting process while the temperature of the dough is controlled by the output of the oven sensor 130, after the kneading is finished.

In this fermenting process, the dough gradually expands. As there is a danger that excessively expanded dough will contact with the lid 103, then if the dough touches the fermentation-regulating sensor 134, the controller 132 forcibly ends the fermenting process, and prevents baking of the dough on the lid 103. Eventually, although the dough is fermented for the prescribed fermentation time, if it ferments for too long, the process switches to the baking process from the time point detected by the fermentation-regulating sensor 134. And in ending the baking process, only the fan motor 126 is successively rotated, and the process then proceeds to the cooling process by introducing external air into the inner case 108.

With these processes, the bread is baked without contacting the lid, and appetizing bread is obtained. It is also unnecessary to clean the lid 103 after use.

Second embodiment

Figure 3:
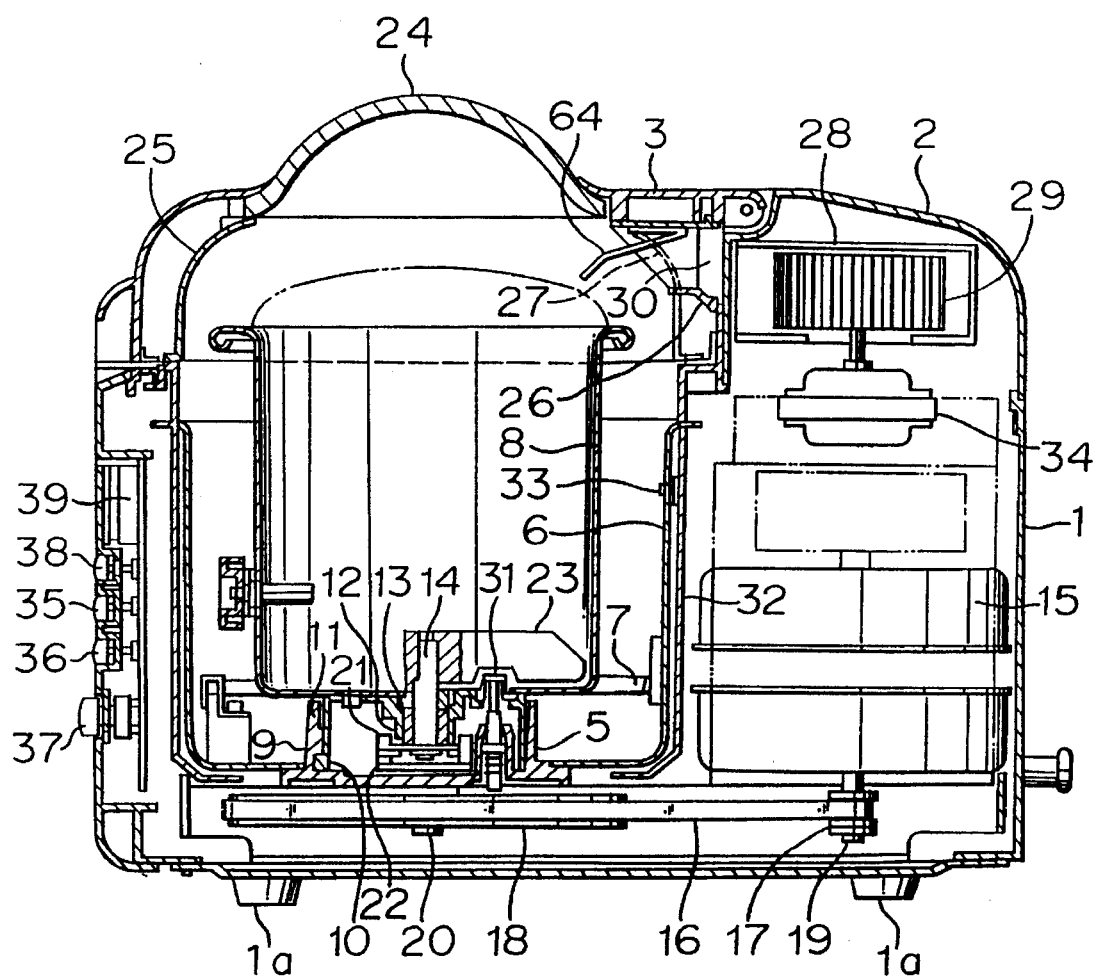
FIG. 3 shows a sectional view of a bread making apparatus according to the second embodiment.

The second embodiment according to this invention is described with reference to the drawings as follows. FIG. 3 is a sectional view showing the construction of a bread making apparatus according to the second embodiment. FIG. 3 shows a baking vessel main body 1, a plural of supporting legs 1a, an upper baking vessel main body 2, a lid 3 constructed openably, a base frame 4, a bearing plate 5, an internal vessel 6, an oven heater 7, a bread baking case 8, a pair of engaging elements 9, 10 and a support plate 11.

Also installed in the external vessel main body 1 are a bearing portion 12, an upper rotating shaft 14, a kneading motor 15, a belt 16, a pair of pulleys 17, 18, an output shaft of the kneading motor 19, a lower rotating shaft 20, a pair of clutch members 21, 22 and a kneading blade 23.

Further installed on the external vessel main body 1 are a glass window 24 of the lid 3, a heat reflective plate 25, an air-suction guide 26, an air-suction port 27, an air-supplying guide 28, an air fan 29, a reverse-flow deflecting plate 30, a dough sensor 31, an adiabatic member 32, an oven sensor 33 fixed on the internal case 6, an air-suction motor 34, a fermentation-regulating sensor 64, a pair of menu selecting buttons 35, 36 and a start button 37.

In FIG. 3 the numeral 38 is an operating key enabling the extension of the forming-fermenting period (hereafter referred to as the "FF period") or cancellation of the extended time. The numeral 39 is a digital display expressing the forming-fermenting time.

Figure 4:
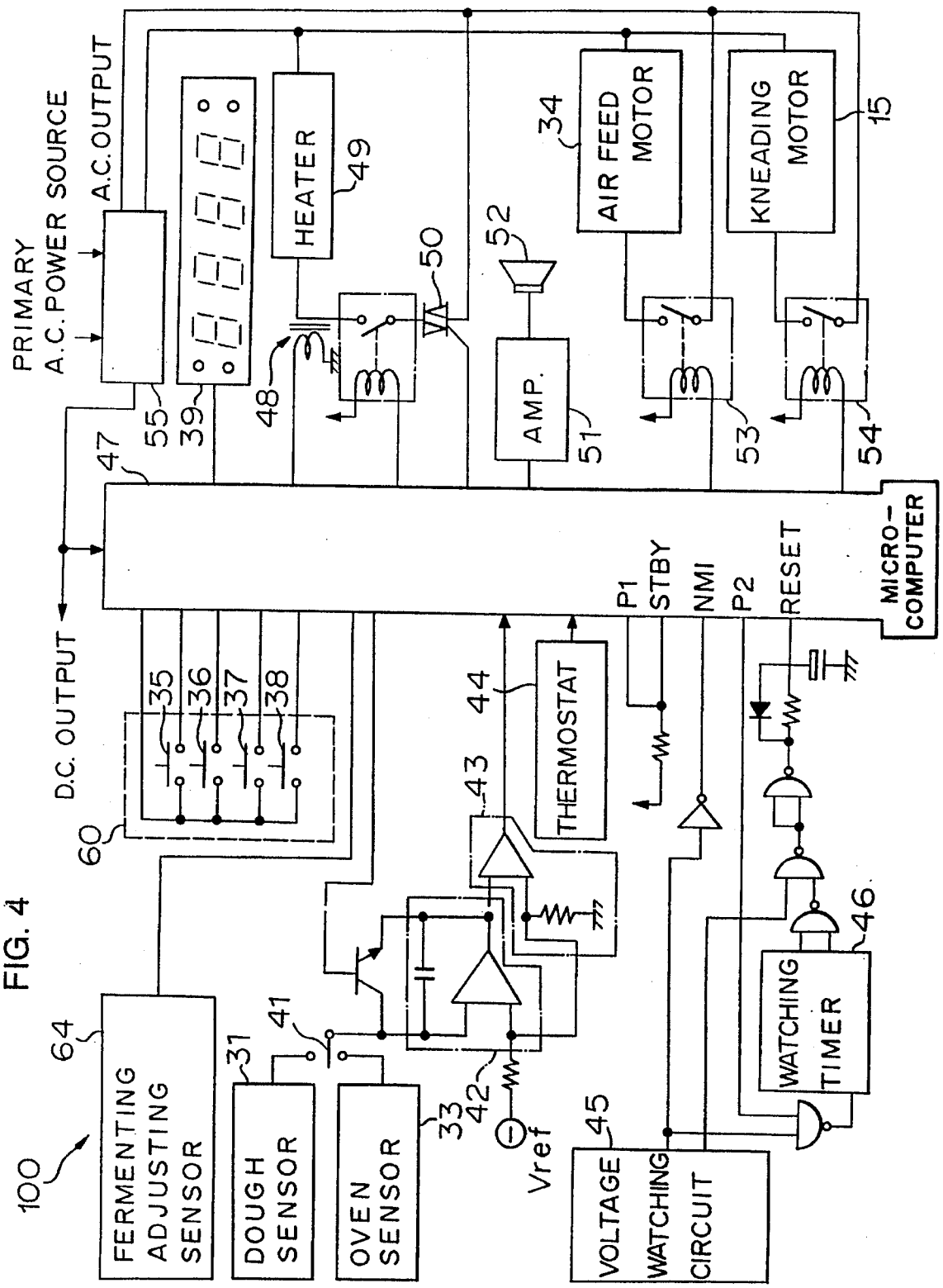
FIG. 4 shows a diagram of a control circuit of the apparatus shown in FIG. 3.

FIG. 4 is a circuit diagram displaying the construction of the control circuit 100 of the bread making apparatus according to the second embodiment, and the same members as those shown in FIG. 3 are identified with the same numerals and the explanations referring to these members are eliminated.

In FIG. 4, the numeral 41 is a switch exchanging the dough sensor 31 with the oven sensor 33, the numeral 64 is the fermentation-regulating sensor, the numeral 42 is an integrator, the numeral 43 is a comparative circuit, the numeral 44 is a thermostat, the numeral 45 is a voltage-watching circuit, the numeral 46 is an abrupt-short watching timer and the numeral 47 is a microcomputer controlling all members. This microcomputer 47 is composed with RAM, ROM and I/O ports and A/D convertors. The control program performing the bread making operation and miscellaneous required data are stored in the ROM.

The numeral 48 is a modulator feeding back the heater current of the oven heater 7, the numeral 49 is a relay circuit turning on or off the heater current of the oven heater 7, and the numeral 50 is a triac controlling the heater current of the oven heater 7.

The numeral 51 is an amplifying circuit and the numeral 52 is a speaker which discharges an alarm. The numeral 53 is a relay circuit controlling the air-suction for controlling the on/off operation of the air-suction motor, and the numeral 54 is a relay circuit controlling the air-suction motor for controlling on/off operation of the kneading motor 15.

The numeral 55 is a power source circuit of the bread making apparatus, and supplies AC power to the oven heater 7, air-suction motor 34 and kneading motor 15, together with converting the primary AC power source into DC power source for the control circuit.

The numeral 60 is an operating panel, and the menu selecting button 35, the menu setting button 36, the start button 37 and the setting key 38 for setting and regulating the forming-fermenting time are installed thereon. The numeral 39 is a digital displayer.

Figure 5:
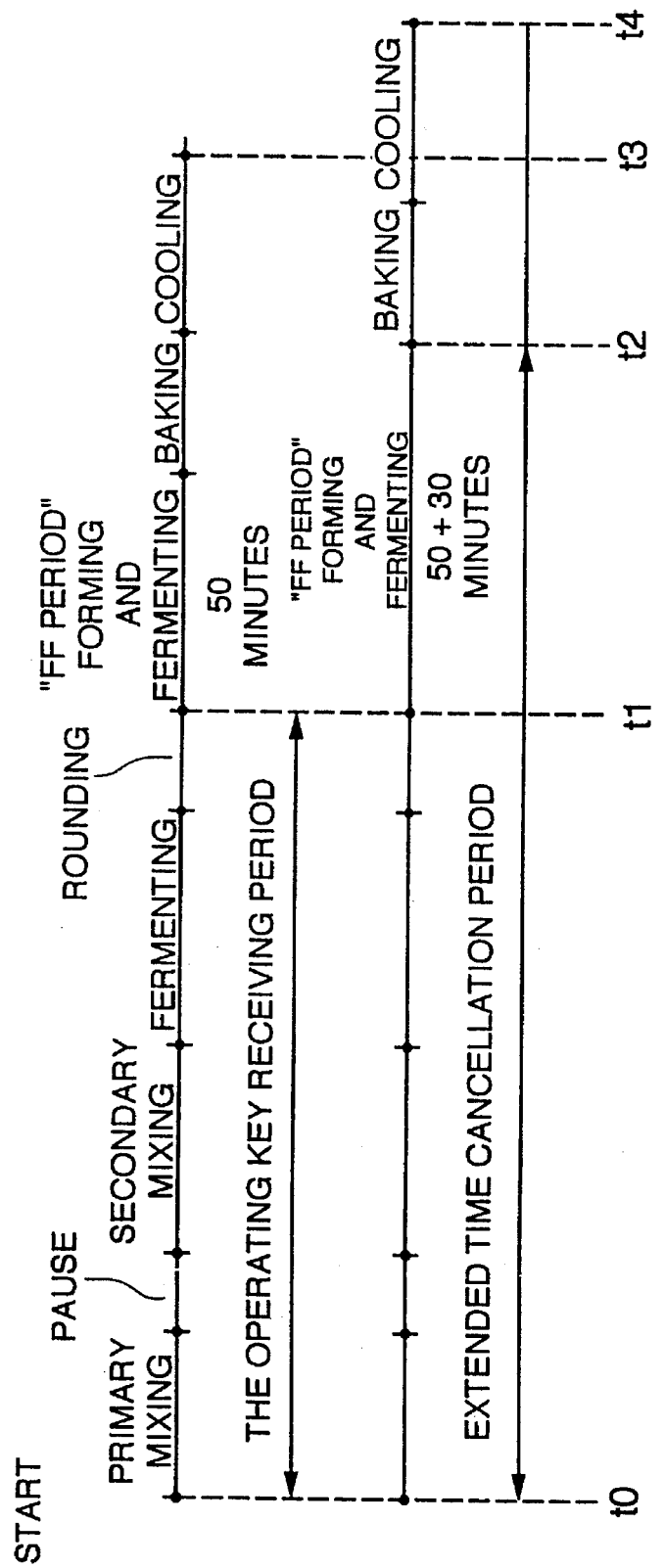
FIG. 5 shows a process diagram of one embodiment of the bread making processes of the apparatus shown in FIG. 3.

FIG. 5 is a process diagram showing the bread making process controlled by the sequential program stored in ROM of the microcomputer 47 in the control circuit of the bread making apparatus according to the second embodiment. FIG. 5 shows, between time t0 to t3, or from time t0 to t4, the total bread making process from the time the start button 37 is pushed on, to the time the cooling process ends. In addition, the period from t0 to t1 shows the duration where the setting key 38 is receivable, enabling extension of the forming-fermenting time by manipulating the operation key 38. The period from t0 to t2 shows the period extending the forming-fermenting time, or the period enabling cancellation of the extended forming-fermenting time.

Namely, in the bread making apparatus according to the second embodiment, the period between time t0, where the bread making process starts by pushing the start button 37, and the time t1 starting the "FF period" usually specified as 50 minutes, is the period capable of receiving the operation key 38, and after reception of the key 38, the "FF period" usually specified as 50 minutes is further extended for as much as 30 minutes. Then when the extended "FF period" comes to an end, it is possible to cancel the extended "FF period."

Figure 6:
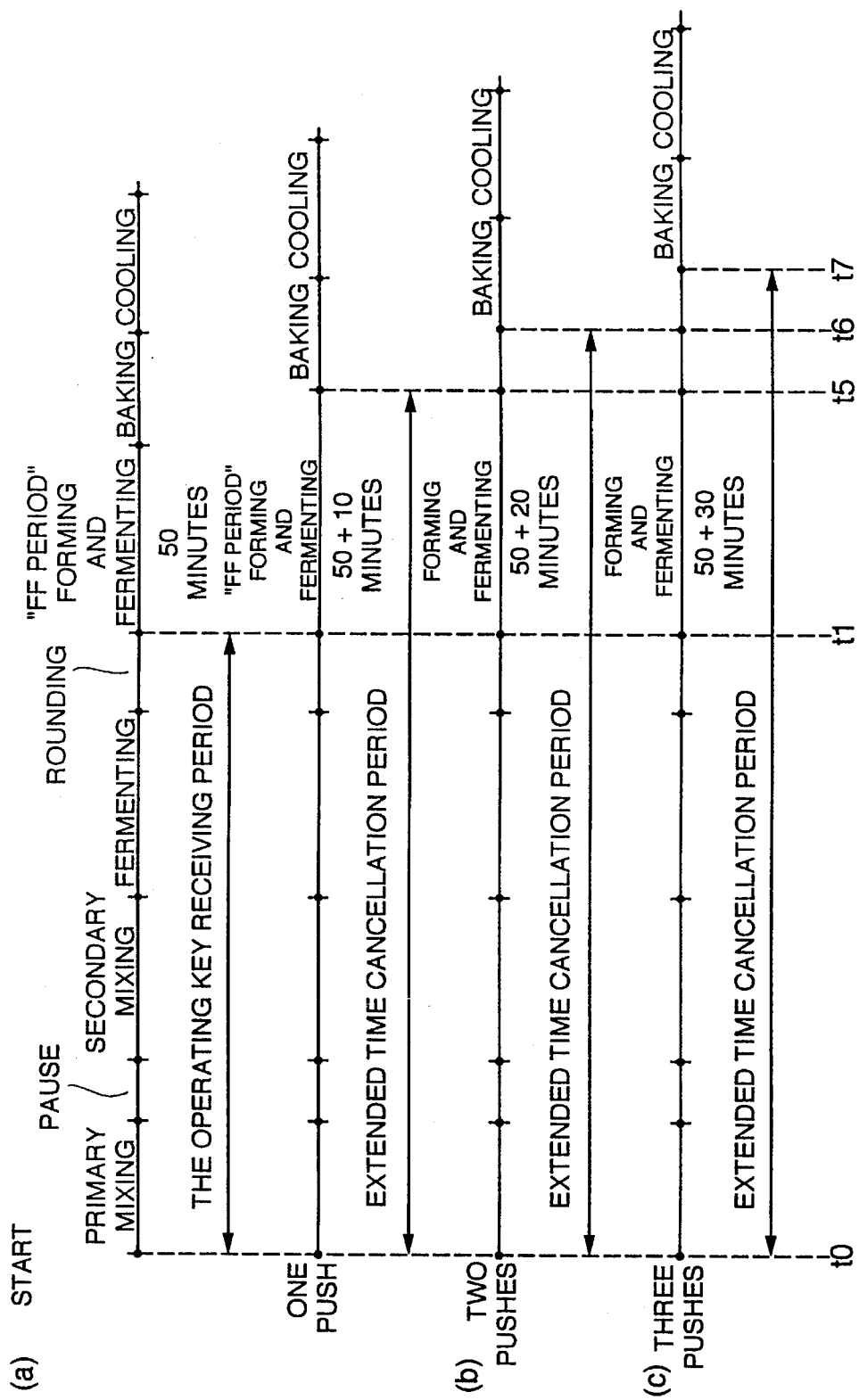
FIG. 6 shows a process diagram of the another embodiment of the bread baking processes of the apparatus shown in FIG. 3.

FIG. 6 is a process diagram which shows other bread making processes stored in ROM of the microcomputer 47 in the bread making apparatus according to the second embodiment of this invention. In this embodiment, period starting from the time t0 (the bread making process starts by pushing on the start button 37) ending at the "FF period" is the period able to receive the instructions of the forming-fermenting period operation key 38, and in accordance with numbers activating the key 38, the "FF period" is extended as much as 10 minutes. Further, by activating the key 38 by a specified number of times (for example, the key 38 is activated four times), the extended time of the "FF period" returns to zero.

FIG. 6(a) shows a process diagram of the bread making processes in the situation where the key 38 is pushed only one time. The "FF period" is extended by only 10 minutes, and the cancellation period of the extended "FF period" is limited to the period of time from start time t0 to finish time of the "FF period" t5. FIG. 6(b) also shows another process diagram of the bread making processes in where the operation key 38 is pressed two times, extending the "FF period" for 20 minutes, and the cancellation period of the extended "FF period" is limited to the period of time from start time t0 to the end time t6 of the "FF period". FIG. 6(c) shows another process diagram of the bread baking processes where the operation key 38 is pressed three times, extending the "FF period" up to 30 minutes, and limiting the cancellation period of the extended "FF period" to the period of time from the start time t0 to the end time t7 of the "FF period".

Figure 7:
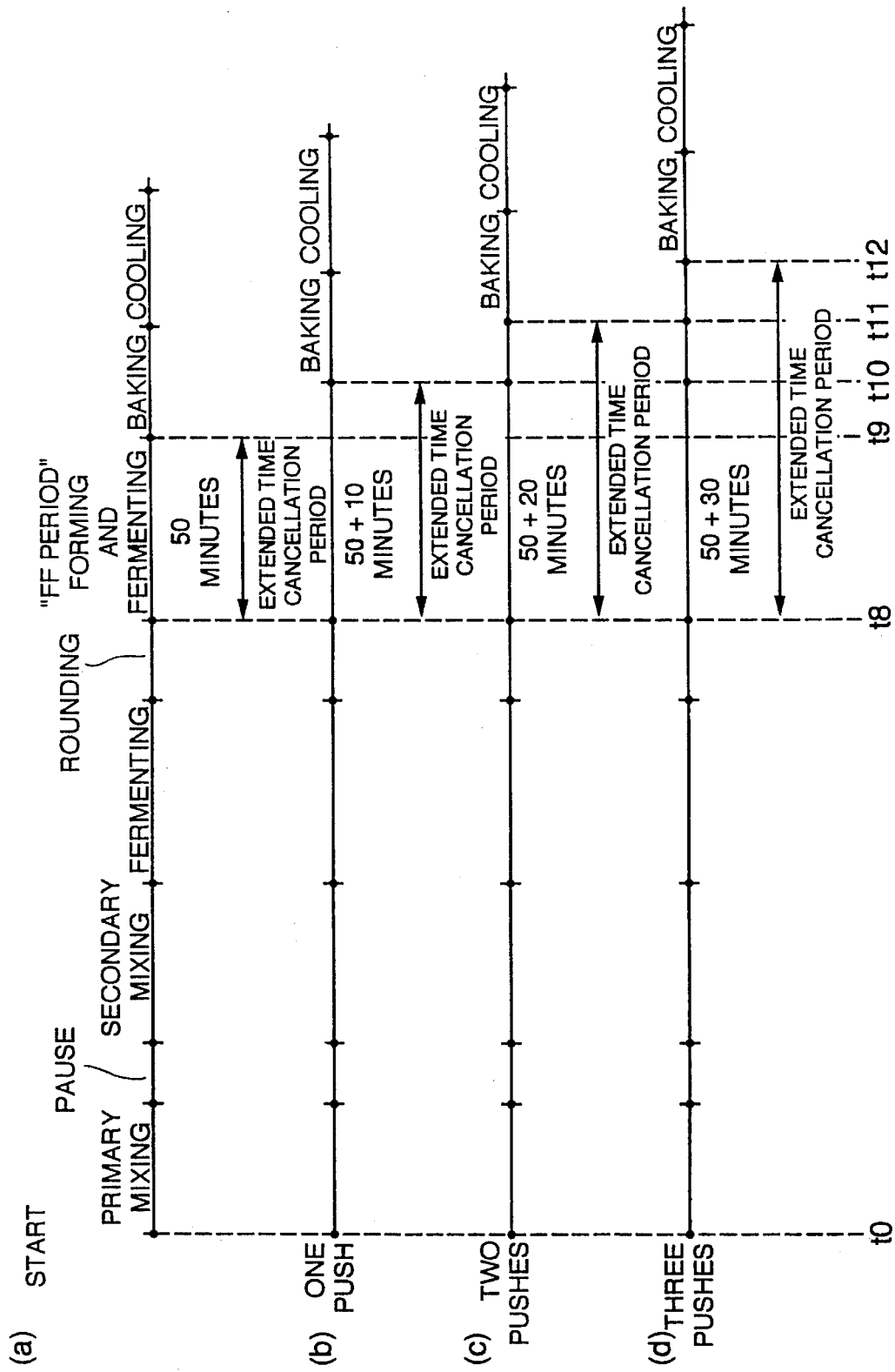
FIG. 7 shows a process diagram of another embodiment of the bread baking processes of the apparatus shown in FIG. 3.

FIG. 7 shows a process diagram of the bread baking processes according to another sequential program stored in ROM of the microcomputer 47 installed in the bread baking apparatus according to the second embodiment.

In this embodiment, the control system is so constructed as to inhibit activation of the key 38, during the period starting from t0 (beginning the bread making process by pushing down the start button 37) and ending at t8 (beginning the "FF period"), and also only during the "FF period" (including the extended "FF period", it is possible to extend or to cancel the preset "FF period").

In this case, the same as in the aforementioned embodiment, the "FF period" is extended every 10 minutes in accordance with the number of times the key 38 is activated. Furthermore, by activating the key 38 a specified number of times (four times, for example), this control system is constructed to return the "FF period" to zero. The residual "FF period" from the present time to the specified end time is also displayed by hours, minutes and seconds on the display 39, and the residual "FF period" is continuously counted down.

FIG. 7(a) shows a process diagram of the bread baking processes, in which the forming-fermenting time-setting key 38 is not entirely applied. The "FF period" is preset to 50 minutes, and the cancellation period for the "FF period" is during the "FF period" preset to 50 minutes and corresponds to the period starting at time t8 and ending at t9. FIG. 7(b) shows a process diagram of the bread baking process, in which the forming-fermenting time-setting key 38 is activated only once, the "FF period" is extended as much as 10 minutes, and the cancellation period of the "FF period" corresponds to the "FF period" including the extended period, and corresponds to the period starting from time T8 and ending at T10. FIG. 7(c) shows a process diagram of the bread making processes in which the forming-fermenting time-setting key 38 is activated twice, then the "FF period" is extended for 20 minutes, and the cancellation period of the "FF period" corresponds to the "FF period" including the extended period, and corresponds to the period starting from time t8 and ending at t11. FIG. 7(d) shows a process diagram of the bread making processes in which the forming-fermenting time-setting key 38 is activated three times, extending the "FF period" as much as 30 minutes, and the cancellation period of the "FF period" corresponds to the "FF period" including the extended period, and corresponds to the period starting from time t8 and ending at t12.

In the aforementioned embodiments, the forming-fermenting time-setting key 38 is used to extend and cancel the processing times, but it may be possible to use the setting key 38 just for setting extensions, and to install another cancellation key for cancelling the set process time.

In FIGS. 4, 5 and 6, embodiments extending the forming-fermenting time by applying the forming-fermenting time-setting key 38 are described, but in each of the embodiments if the fermentation-adjusting sensor 64 issues a detection signal, the detection signal takes precedence over everything, stopping the fermentation process and automatically controlling the process so that it switches to the next baking process.

The third embodiment

Figure 8:
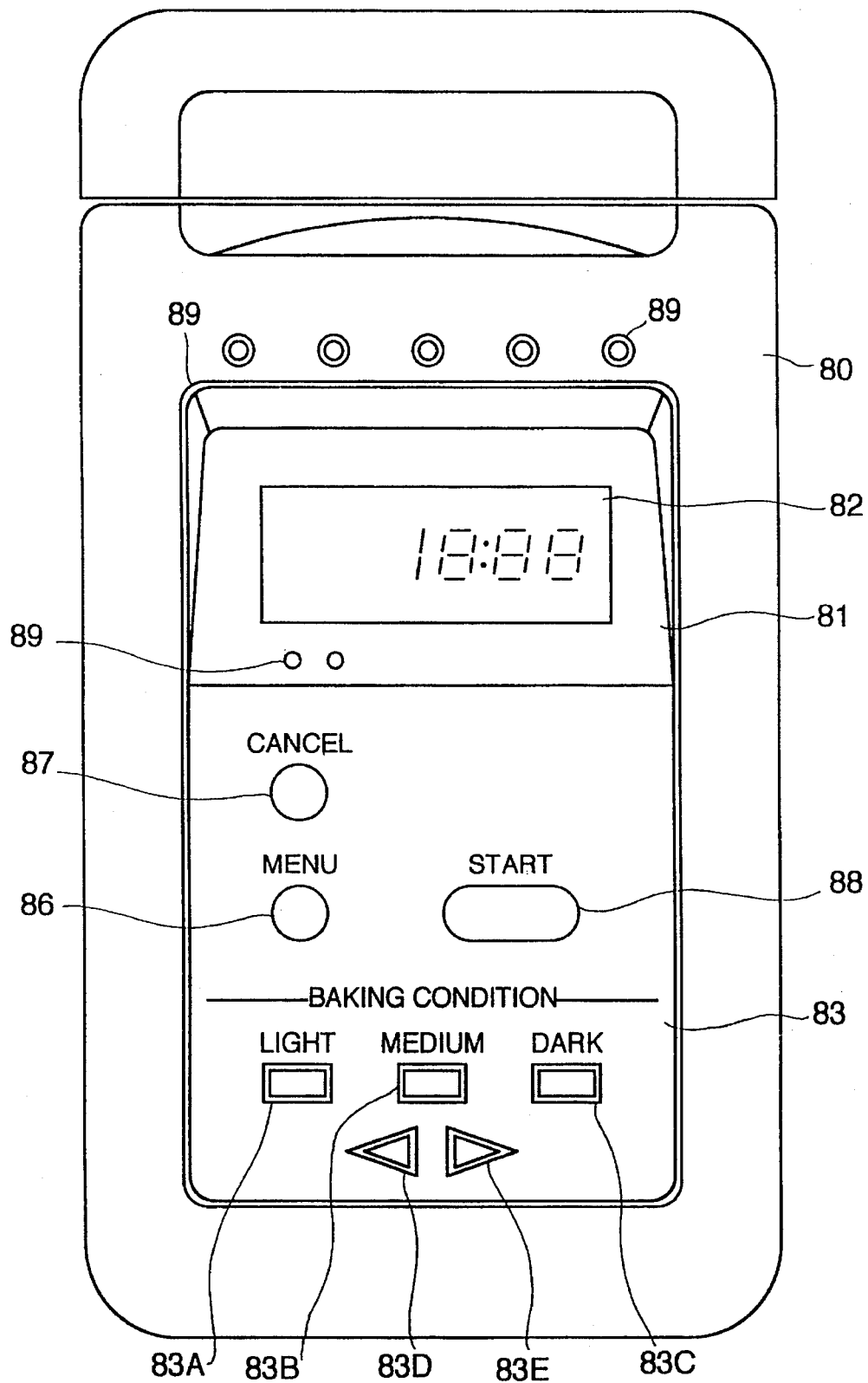
FIG. 8 shows a front view of the controller in the bread making apparatus according to the third embodiment.

The third embodiment of this invention is described as follows. FIG. 8 shows an operation panel 81 of a control unit 80 of the bread making apparatus according to this invention, and the control unit 80 is installed in the bread making apparatus A shown in FIG. 1. Namely, the control unit 80 is installed on the front portion of the oven main body 101.

The control unit 80 is provided with a display 82 made of liquid crystal indicating cooking time, present time and the like, a plural of setting buttons 83 setting the color of the bread during the baking process, i.e., light, medium or dark, and a timer controller 84 (timer device) regulating the baking color of the dough by extending the baking process time t from the standard dough temperature T0 as much as the dough will become in the specified baking color set by the setting button 83, are provided on the operation panel 81 located on the front of the oven main body 101. Here the standard dough temperature T0 is a temperature which produces bread of a specified color, namely a light color.

The signal obtained by setting any of buttons 83 is input into the timer controller 84, and the color of the bread surface is determined, either light, medium or dark, in accordance with the set button. In addition to these baking condition setting buttons, an incremental button 83D and a decremental button 83E are also provided.

Further, on the operation panel 81, a menu button 86 for setting the menu, a cancellation button 87, a start button 88 and a plural of display lamps indicating the content of these buttons are provided.

The controller 84 is comprised of a printed circuit board and ICs, and includes CPU, RAM, ROM, a timer and a watch, and connected to the liquid crystal display 82, the setting buttons 83, the sensors, including the oven sensor 130, the operating buttons for the main heater 112 and the like, and display lamps with this arrangement, the controller 84 controls the specified operations. Namely, when the dough temperature T transmitted from the dough sensor 123 reaches the standard dough temperature T0, the CPU allows the timer to start to count time. Then, when the time counted reaches the after-defined X time or Y time corresponding to the color specified by a plural of set buttons 83, the CPU stops the baking process.

The working of these operations are described as follows.

First, the volumetrically specified materials such as bread ingredients, water and the other like, are placed in the bread baking case. Then the menu-displaying lamps 89 are set to the preferred conditions (for example, set at a loaf of bread) by pushing the menu button 86, and the color of the bread is set at either light or medium by pushing either of the push buttons 83A or 83B, or, by pushing the increase button 83E, the color is changed to dark. Although these conditions are not displayed in the drawing, it is possible to confirm the condition by displaying on the liquid crystal display by dividing the display in three steps between medium and dark.

After the menu is set, the start button 88 is pushed down. The motor 119 then starts to rotate by receiving the signal from the control unit 80, and the driving force of the motor 119 is transmitted to the shaft 117 via the pulley 120, belt 122 and pulley 121. Then the kneading blade 114 is driven and performs the first kneading. After pausing for a little while, the second agitation is performed, and at last the cooling operation is performed by the cooling fan driven by the fan motor 126, and the bread making process if finished.

In the above described processes, the baking process progresses as follows. Namely, as shown in FIG. 9, from time t starting the baking process, the dough temperature T0 of the inner portion of the dough is always detected by the dough sensor 122, and monitored by the control unit, and when the CPU detects that the dough temperature T has reached the standard dough temperature T0, namely, the dough temperature corresponding to a light color, then the timer starts to count time.

If a light bread color is selected with the setting button 83 (namely, the set button 83A is pressed down) and the selected color is the same as the specified color, the baking process stops when the dough temperature T reaches the standard dough temperature T0.

Figure 9:
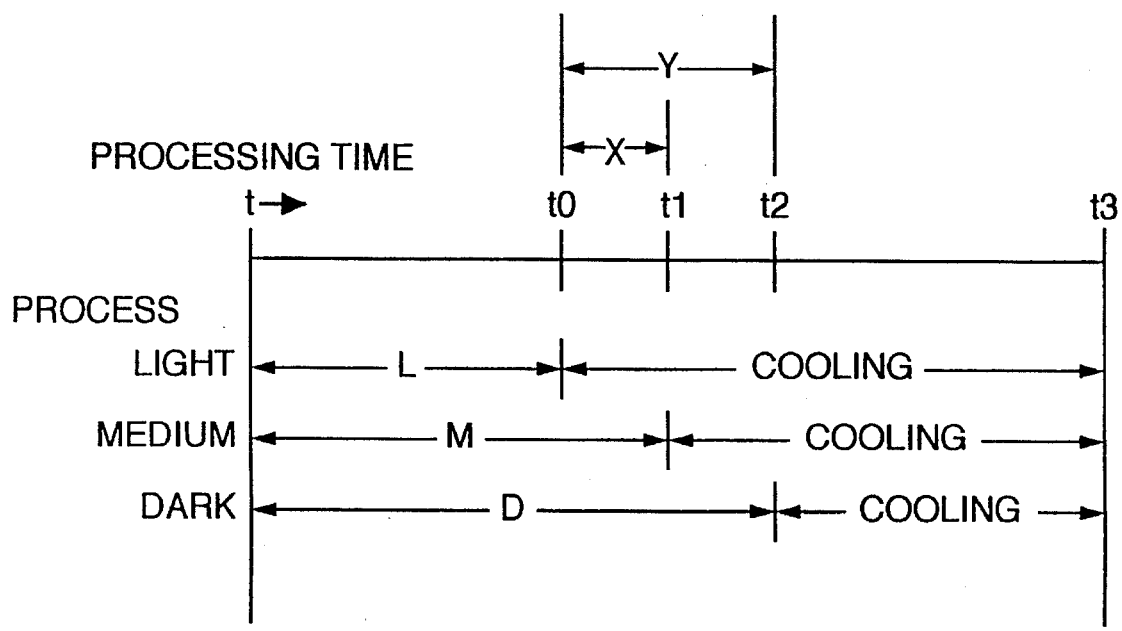
FIG. 9 shows a diagram of the baking process of the bread making apparatus shown in FIG. 8.

When a "medium" bread color is selected with the setting button 83B, the baking process stops at time t2 counted X times from the time t0 that the dough temperature T reaches the standard dough temperature T0 (this process between time t and time ti is shown as "process M" in FIG. 9).

Also when a "dark" color is selected with the setting button 83C, the baking process stops at time t3 counted Y times from the time t0 that the dough temperature T reaches the standard dough temperature T0 (this process between time t and t2 is shown as "process D" in FIG. 9). After each of L, M and D processes has stopped, the cooling process begins and each end time of the cooling process is programmed the same as time t3.

Figure 10:
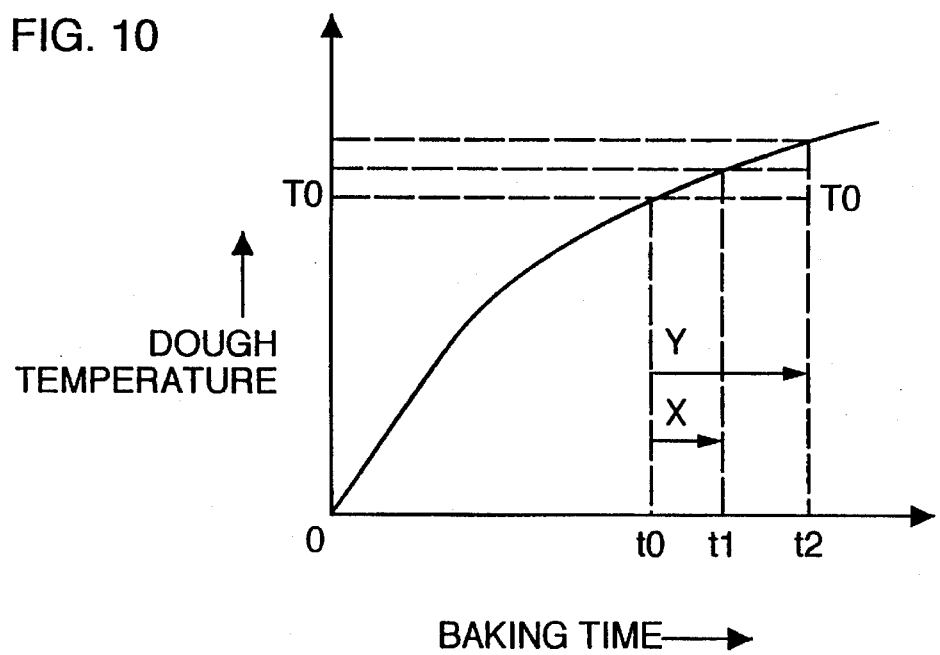
FIG. 10 shows the relationship between dough humidity and baking time in the bread making apparatus shown in FIG. 9.

The relation between X times and Y times is in fact X<Y, and even if there are variations in the quality and combinations of the raw ingredients, it is possible to bake with specified difference and if specified at the same color, it is also possible to bake until the same color. The baked condition is explained as follows, by applying the temperature rise diagram show in FIG. 10. When a light color has been selected, the dough is baked at the standard dough temperature T0, after the baking time t0. When medium or dark are requested, time counting starts from time t0, and after the counted time X and Y, the baking condition becomes either medium or dark.

As only the elapsed time X=t1–t0 and Y=t2–t0 are specified in this embodiment, the color of the surface of the bread is not dependent upon the quantity and combination of the ingredients, but only upon the elapsed baking time. As a result, it is always possible to obtain bread having a consistent color.

The fourth embodiment

Figure 11:
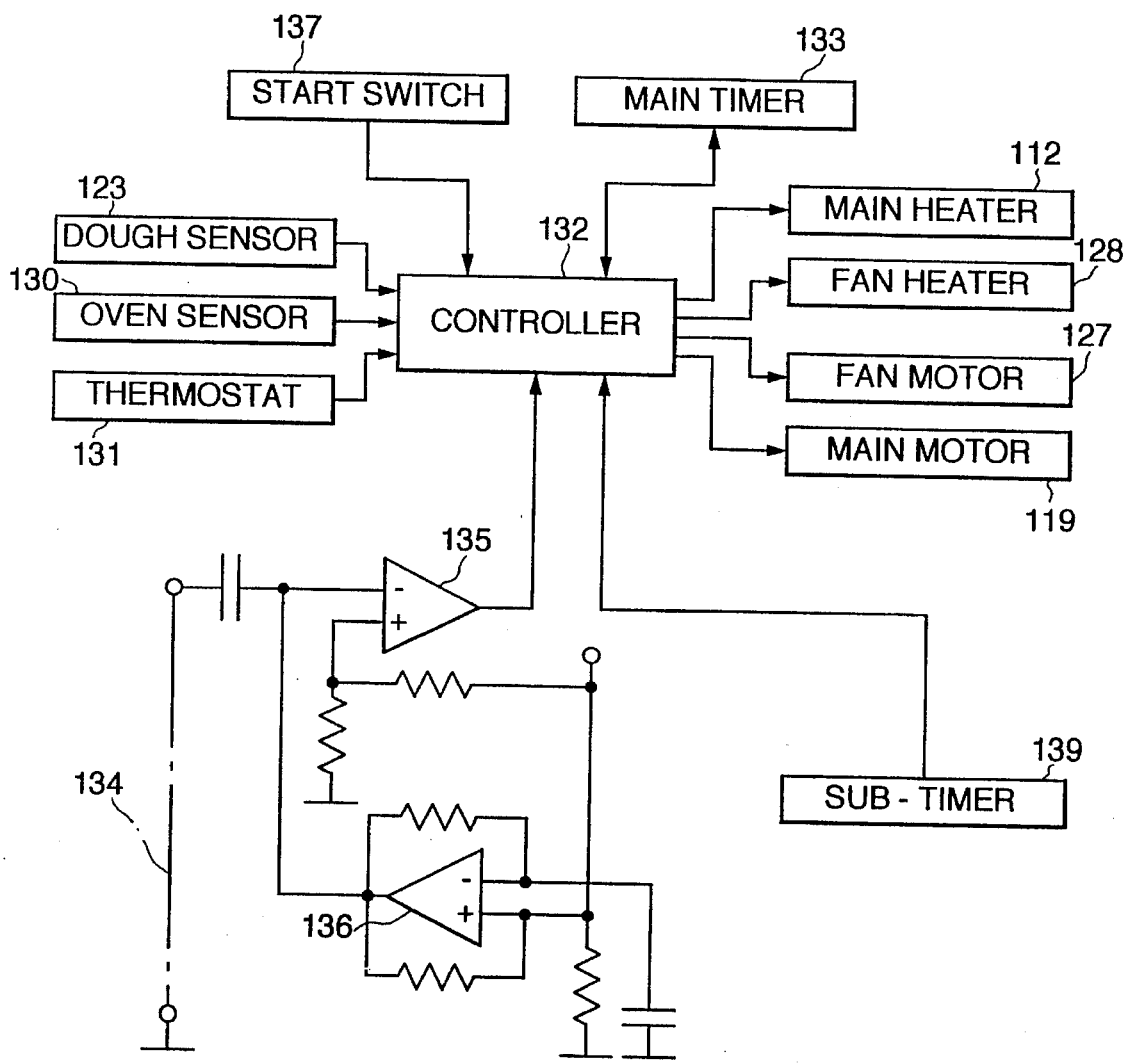
FIG. 11 shows a control circuit of the bread making apparatus according to the fourth embodiment.
Figure 12:
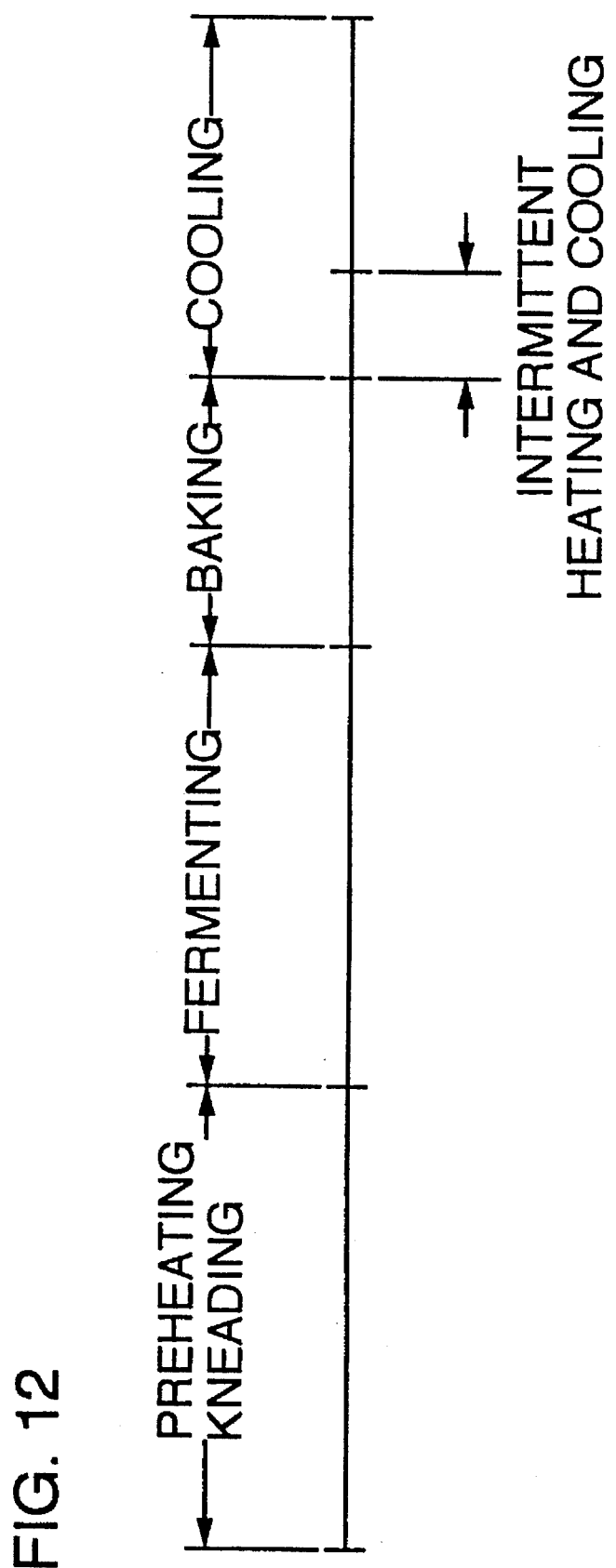
FIG. 12 shows the bread making processes of the bread making apparatus shown in FIG. 11.

The fourth embodiment of this invention is described as follows. FIG. 11 shows the control section of the bread making apparatus A show in FIG. 1 according to this invention.

In FIG. 11, the numerals which are the same as those shown in FIG. 2 are not explained. Herein, the numeral 139 is a subtimer. This subtimer 139 is provided for intermittently activating the fan motor 128 and/or main heater 112.

The bread making workings are explained as follows. The specified bread ingredients are placed in the bread baking case 113 and the lid 103 is closed. The baking time is set by applying the aforementioned main timer 133. By pushing the start button 137 on the operation board 102, the main heater 112 is turned on and the preheating process begins. When that process ends, the main motor 112 starts to drive the kneading blade 114 and the ingredients are kneaded. The fan motor 126 then starts to rotate and hot air heated by the fan heater 128 is supplied into the bread baking case 113. The kneading process then starts, and the dough is made. In this case, these processes progress under a temperature lower than that at which yeast is killed, by controlling the heating temperatures of the main heater 112 and the fan heater 128 by applying the controller 132. After the kneading process ends, the fermenting and baking processes begin while the dough temperature is controlled by the output of the oven sensor 130.

When the above-mentioned baking process ends, the bread making process switches to the final cooling process by activating only the fan motor 128, and introducing external air into the inner oven case 108. In this cooling process, the bread is gradually cooled by intermittently driving the fan heater 128 and/or the main heater 112 at specified periods (for example, by driving for 2 seconds and stopping for 2 seconds) by applying the subtimer 139, without abrupt cooling by introducing cold external air. Thus an abrupt temperature drop after switching to the cooling process is preventable, and as the temperature of the bread baking case 113 does not suddenly become lower than the surface temperature of the bread, then it is also possible to prevent the freezing of the vapor generated from the surface of the bread on the internal surface of the bread baking case 113 in the cooling process. By also correctly setting the cooling period and intermittent ON-OFF time of the fan heater 128, the surface temperature of the bread after the end of the above-mentioned intermittent heating generously drops, and bread with a desired surface hardness is obtained by this effective after-cooling.

The fifth embodiment

Figure 13:
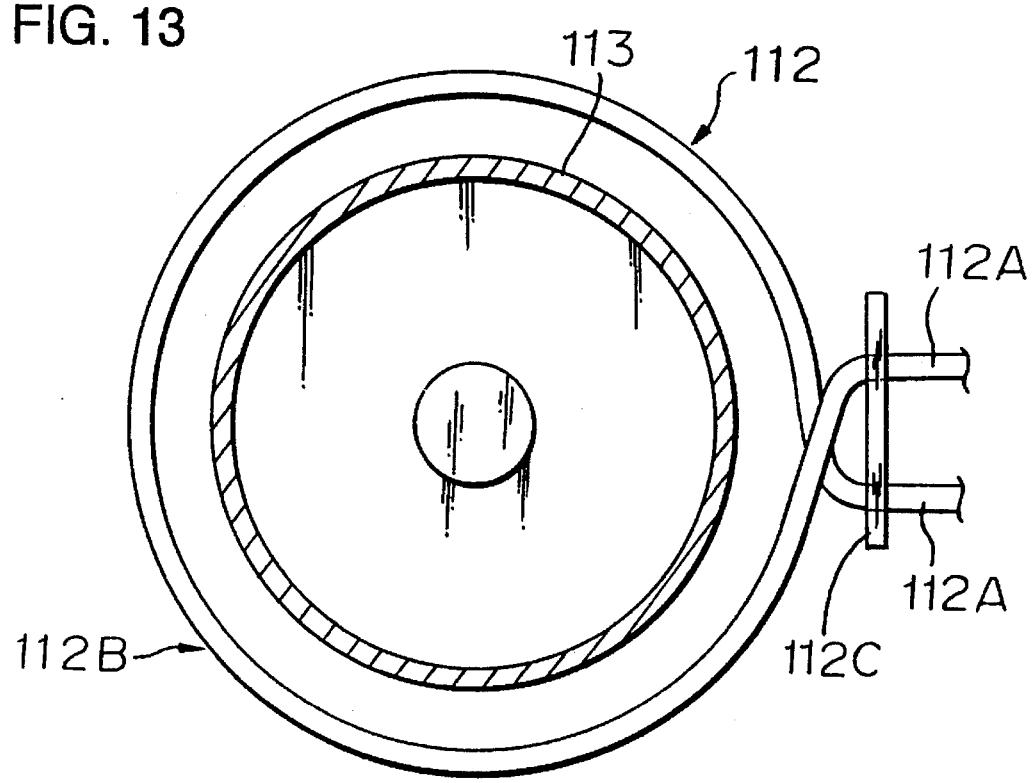
FIG. 13 shows the main heater of the bread making apparatus according to the fifth embodiment.

The fifth embodiment of this invention is described with reference to the drawings as follows. FIG. 13 shows the main heater 112 of the bread making apparatus A according to this invention.

The bread baking case 113 is placed in the inner oven case 108, and around the inner surface of the oven case 108, the main heater equivalent to the electric heater radiating heat is so installed as to encircle the bread baking case 113. The kneading blade 109 agitating the ingredients in the baking case 113 is rotatably installed therein so as to be driven by not shown a driving device In the above arrangement, the bread baking case 113 is a cylindrical case having a bottom plate, and the main heater 112 concentrically surrounds the case 113 by shaping a ring, and both end portions 112A, 112A connected to the power source circuit (not shown) are supported on the support member 112 crossing each other. With this arrangement, the high heat-generating portion 112B of the heater 112 is able to continuously surround the bread case 113. By adopting this heater arrangement, only the high heat-generating portion 112B of the heater 112 perfectly surrounds the bread baking case 113, uniformly heating the case 113, and unevenness in the bread baking is accordingly prevented.

The sixth embodiment

Figure 14:
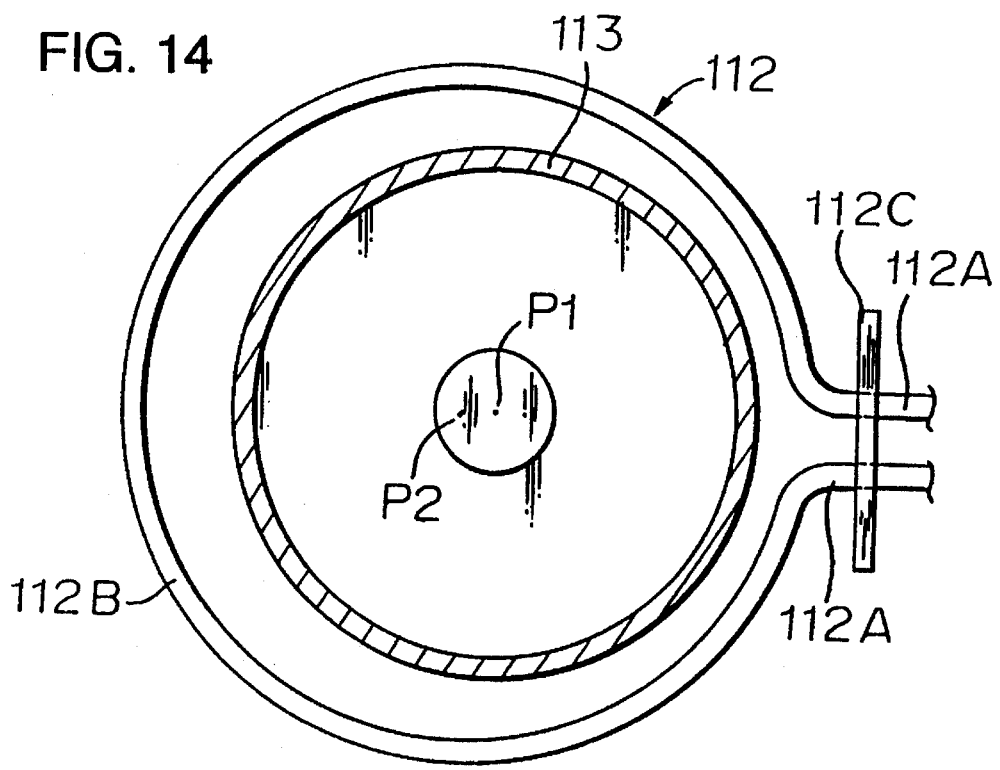
FIG. 14 shows the main heater of the bread making apparatus according to the sixth embodiment.
Figure 15:
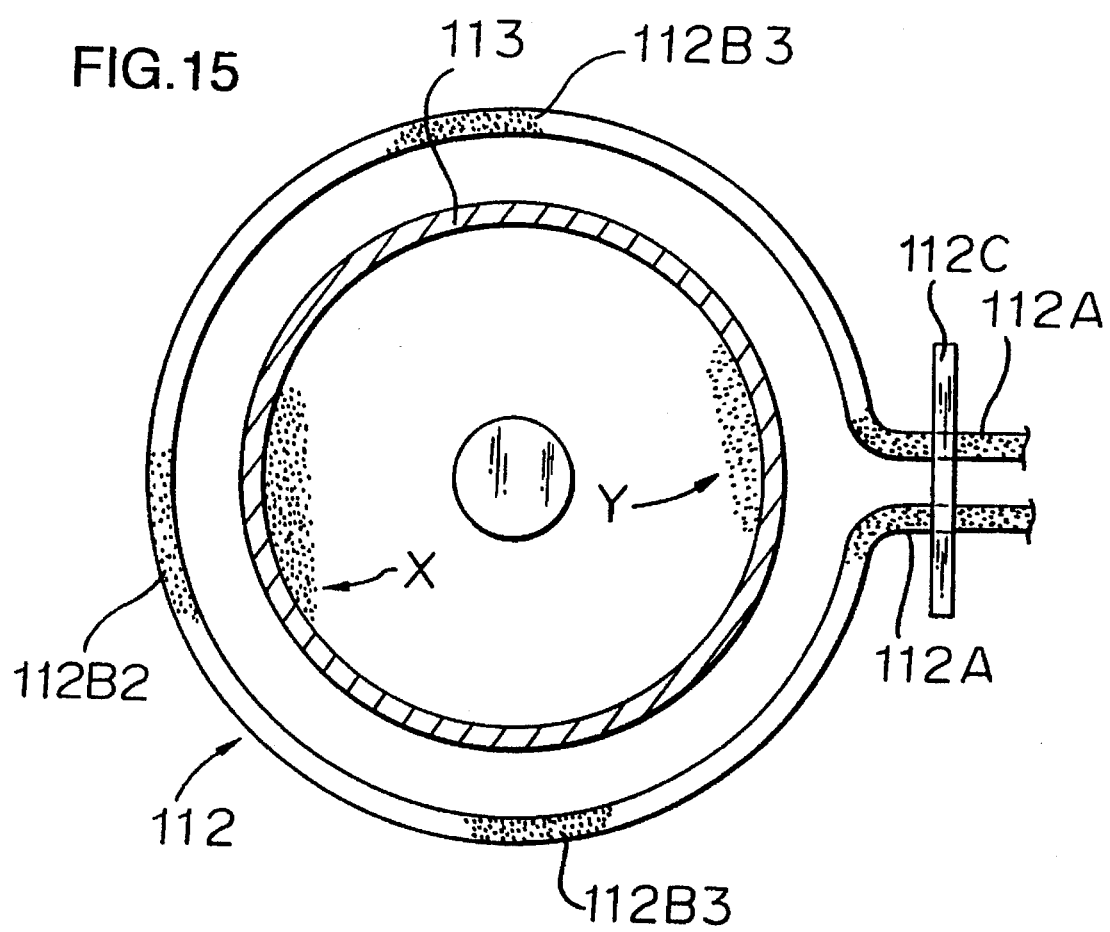
FIG. 15 shows the main heater of the conventional bread making apparatus.

FIG. 14 shows the sixth embodiment. In this embodiment, the center P1 of the bread baking case 113 is shifted from the center P2 of the ring-shaped heater 112. Both ends 112A, 112A of the heater 112 equivalent to low heat-generating portions are placed near the case 103 and a high heat-generating portion 112B is placed apart from the case 103. By adopting this arrangement, the heat quantities radiating to the bread baking case 103 corresponding to the low heat-generating portions 112A, 112A of the heater increase and conversely the heat quantities radiating to the baking case 103 corresponding to the high heat-generating portion 112B of the heater decrease. As a result, the heat quantities radiating to the bread baking case 113 are uniformly equalized against all external surfaces of the baking case, and favorable heating effects, similar to the fifth embodiment, are obtainable. FIG. 15 shows heat distribution where both centers of the heater 112 and the bread baking case 113 are concentric. The X portion of the case 113 is heated to the maximum, and the Y portion is heated to the minimum. In this embodiment, this arrangement is applied to the round-shaped baking case, but it is possible to obtain the same effect with a square-shaped case.

By applying the first embodiment, it is possible to detect the expansion of the dough by the sensor before the dough will touch to the lid, and to let forcibly the process transfer to the next baking process even if the process is on the way of the fermenting process, when the dough will grow up to excess expanded condition due to the effect of the external temperature or humidity. As a result, it becomes possible to bake up the bread in good condition and to prevent the contamination of the lid.

With applying the second embodiment, if the fermentation time is short, it is possible to extend the forming-fermenting time and to discontinue any imperfect bread making process caused by a progression to the next process even where the forming-fermenting was deficient.

By applying the third embodiment, it becomes possible to bake bread having a consistent color despite variations in quantity and combination of the raw ingredients. It is further possible to accurately obtain breads of differing colors by setting the standard dough temperature, by providing timer means setting the baking time starting from the time that the dough reaches the standard dough temperature according to the color set by the time setting means after the temperature detecting means has detected the dough temperature has reached the standard temperature.

By applying the fourth embodiment, in the cooling process following baking, the supplemental heat is supplied intermittently and parallely by ON-OFF operations of the heating means, together with the cooling by the air supply means, and as the temperature drop in the bread baking case immediately after transferral to the cooling process is prevented, it becomes possible to prevent frosting of the steam due to the temperature difference with the bread. Also, by the relative adjustment of the ON-OFF time of the heating means and the cooling time, it is possible to produce bread having the most favorable surface hardness, and to obtain delicious bread.

What is claimed is:

1. Bread making apparatus comprising;

a bread baking oven having an upper opening;

a bread baking case detachably installed in said baking oven;

a lid installed on said baking oven to selectively open and close said upper opening;

control means comprising a micro computer and read-only-memory for storing and executing a programmed sequence of steps including a primary kneading step, a pausing step, a secondary kneading step, a fermentation step and a baking step, said control means further comprising temperature detecting means for detecting the dough temperature, color setting means for setting the desired color of the processed bread, and timer means for setting a new baking time starting from the time when a specified standard dough temperature corresponding to said baked color set by said color setting means is reached after detection by said temperature detection means of the dough reaching a preselected temperature.

2. A bread making apparatus as claimed in claim 1, wherein said control means is further provided with air supply means for supplying air into said enclosed bread baking oven for dehumidifying said baked bread, and heating means for intermittently heating said baked bread at specified intervals of ON-OFF action while said air supply means is operated.

3. A bread making apparatus as claimed in claim 2, wherein said heating means comprises a heater installed around said bread baking case in a shape of ring-like form, both ends of said heater being placed at the power inputting side crossing each other, whereby lower heat-generating portions of said heater are not installed around said bread baking case.

4. A bread making apparatus as claimed in claim 3, wherein the center of said heater is placed at a position shifted from the center of said bread baking case so that the lower heat generating portions of said heater placed near the power inputting portion are more nearly located around said bread baking case than other higher heat-generating portions of said heater.

5. A bread making device provided with a bread baking case installed in a baking oven and provided with a lid openably mounted on said baking oven, in which bread baking steps including kneading raw ingredients to make a dough, fermentation of the dough, baking bread and cooling baked bread are performed sequentially, comprising:

temperature detecting means for detecting the temperature in the oven before the start of kneading;

preheating control means, which is provided with a first ROM, for memorizing a plurality of temperature ranges of which the highest value is a predetermined temperature at which said kneading step starts and which successively decrease;

means for determining a particular temperature range to which said detected temperature in the oven belongs, and a second ROM for memorizing duty ratios of current flow for a heater corresponding to each temperature range; and means for heating the oven up to said predetermined temperature with the duty ratio corresponding to said temperature range when said detected temperature in the oven is below the predetermined temperature.

6. A bread making device as claimed in claim 5, wherein said pre-heating control means is further provided with means for keeping the temperature of the heated oven at its temperature for a predetermined time period before starting the kneading step.

* * * * *